US010536551B2

(12) United States Patent
Debald et al.

(10) Patent No.: US 10,536,551 B2
(45) Date of Patent: Jan. 14, 2020

(54) CONTEXT AND SOCIAL DISTANCE AWARE FAST LIVE PEOPLE CARDS

(71) Applicant: MICROSOFT TECHNOLOGY LICENSING, LLC, Redmond, WA (US)

(72) Inventors: Stefan Debald, Oslo (NO); Oleg Melnychuk, Oslo (NO); Manfred Nysted Berry, Oslo (NO); Andreas Eide, Oslo (NO); Alexander J. Pope, Oslo (NO); Lucian Baciu, Oslo (NO); Janaka C. Perera, Oslo (NO); Ivan Dijan, Oslo (NO); Marius Tennoe, Oslo (NO); Dmytro Baglai, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 303 days.

(21) Appl. No.: 15/399,921

(22) Filed: Jan. 6, 2017

(65) Prior Publication Data
US 2018/0198884 A1 Jul. 12, 2018

(51) Int. Cl.
H04L 29/08 (2006.01)
G06F 3/0482 (2013.01)
H04L 29/06 (2006.01)

(52) U.S. Cl.
CPC ........ H04L 67/2842 (2013.01); G06F 3/0482 (2013.01); H04L 67/22 (2013.01); H04L 67/42 (2013.01)

(58) Field of Classification Search
CPC . G06F 3/0482; G06F 17/30867; G06Q 10/10; H04L 67/22; H04L 67/2842; H04L 67/42
See application file for complete search history.

(56) References Cited

U.S. PATENT DOCUMENTS 8,938,690 B1 1/2015 Khouri et al.
2005/0076013 A1 4/2005 Hilbert et al.
(Continued)

FOREIGN PATENT DOCUMENTS

EP 1271371 A2 1/2003

OTHER PUBLICATIONS

"International Search Report and Written Opinion Issued in PCT Application No. PCT/US2018/012281", dated Mar. 2, 2018, 12 Pages.
(Continued)

Primary Examiner — Gil H. Lee
(74) Attorney, Agent, or Firm — Liang IP, PLLC

(57) ABSTRACT

Context and social distance aware fast live people cards are described. A user context and/or a relevant person context may be determined in response to detecting a user interest in viewing contact information. The user context may include user's attributes such as organizational position, preferences, location, working hours, which application the user is employing, etc. Relevant person context may include context information (similar to the user's) for people within a predefined social distance such as the user's peers, supervisor(s), close friends, etc. Information associated with one or more persons of interest to the user may then be selected and retrieved from a cache storage at a server a productivity service to be provided to a client application for display to the user. Information to be stored in server cache for rapid retrieval may also be selected based on user and relevant person context using observed user behavior.

20 Claims, 16 Drawing Sheets

(56) References Cited

U.S. PATENT DOCUMENTS

| | | | |
|---|---|---|---|
| 2007/0271232 A1* | 11/2007 | Mattox | G06Q 10/10 |
| 2010/0299363 A1* | 11/2010 | Bhattacharjee | G06Q 10/10 |
| | | | 707/796 |
| 2011/0014897 A1* | 1/2011 | Finucan | G06Q 10/10 |
| | | | 455/412.2 |
| 2012/0290950 A1 | 11/2012 | Rapaport et al. | |
| 2013/0282828 A1 | 10/2013 | Lawler et al. | |
| 2013/0332460 A1 | 12/2013 | Pappas et al. | |
| 2014/0052718 A1 | 2/2014 | Waupotitsch et al. | |
| 2014/0365513 A1 | 12/2014 | Aftab et al. | |
| 2015/0019522 A1* | 1/2015 | Kim | G06F 3/048 |
| | | | 707/706 |
| 2015/0100893 A1 | 4/2015 | Cronin et al. | |
| 2015/0135096 A1 | 5/2015 | Dhara et al. | |
| 2015/0163320 A1* | 6/2015 | Hu | H04L 67/2852 |
| | | | 709/214 |
| 2015/0205822 A1* | 7/2015 | Jain | G06F 17/30289 |
| | | | 707/803 |
| 2016/0070790 A1* | 3/2016 | Bhat | G06F 17/30864 |
| | | | 707/722 |
| 2017/0289301 A1* | 10/2017 | Gamaley | H04L 67/2852 |
| 2017/0346917 A1* | 11/2017 | Busayarat | G06F 17/30424 |

OTHER PUBLICATIONS

Sanderse, Wannes, "Google Now!", In MA Thesis, Jun. 27, 2014, 41 pages.

"How do I add a context card to my lead ad form?", https://www.facebook.com/business/help/1664458123767694, Retrieved on: Nov. 10, 2016, 2 pages.

"Enhance Your Site's Attributes", https://developers.google.com/search/docs/guides/enhance-site, Published on: Jun. 22, 2016, 7 pages.

* cited by examiner

CONTEXT AND SOCIAL DISTANCE AWARE FAST LIVE PEOPLE CARDS

BACKGROUND

The lines between productivity applications are blurring increasingly with applications making use of a wide range of available data to provide a growing number of services to users. For example, email applications that allowed exchange of text-based messages among users have evolved into multi-purpose applications and application suites that allow users to take advantage of many services beyond email communication. Users can receive information and suggestions for meetings, exchange of data, relevance, and much more through a single user interface and perform as many tasks such as exchanging documents, multi-modality communications, scheduling meetings, installing and using software applications, etc.

With the wide range and wealth of available information about people and their environments, prioritizing and presenting the information to a user becomes a challenge. In the increasingly cloud-based software environments, efficient usage of resources like memory, storage, processing, etc. are factors to be considered as well. Thus, making available all information is not only resource-inefficient, but may also degrade user experience.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing context and social distance aware fast live people cards. In some examples, a user context and/or a relevant person context may be determined in response to detecting a user interest in viewing contact information, information to be used as content for live people cards may be retrieved from a cache storage on a server by a productivity service and provided to a client application for display to the user. User context and behavior information may also be provided to the server in some examples to determine relevant people based on social distance and to be stored in the cache storage for rapid retrieval. In other examples, social distance information may be retrieved from a graph based relationship application.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1A:
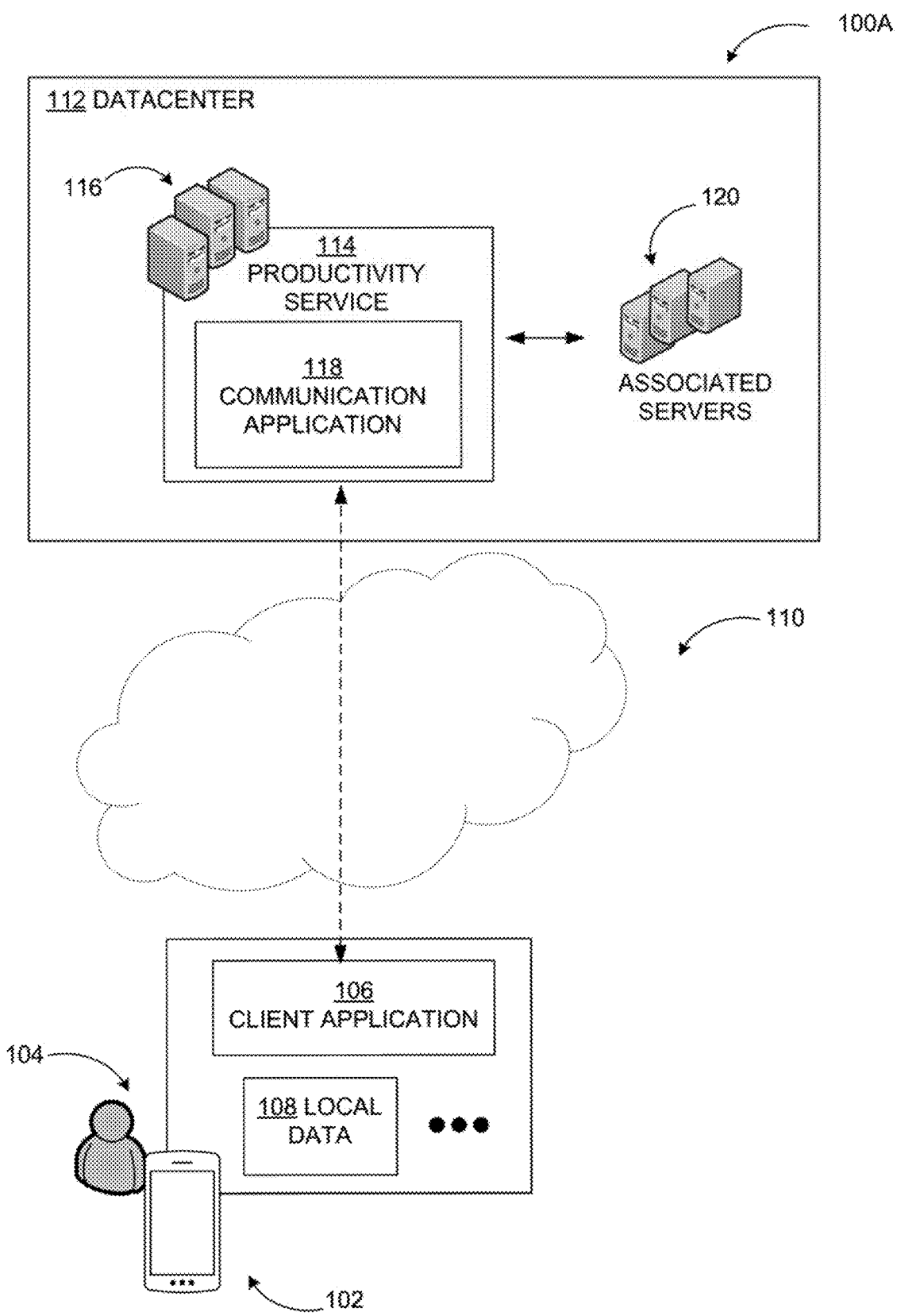
FIG. 1A-1C include display diagrams illustrating example network environments where context and social distance aware fast live people cards may be implemented.

As briefly described above, embodiments are directed to providing context and social distance aware fast live people cards. A user context and/or a relevant person context may be determined in response to detecting a user interest in viewing contact information. The user context may include user's attributes such as organizational position, preferences, location, working hours, which application the user is employing, etc. Relevant person context may include context information (similar to the user's) for people within a predefined social distance such as the user's peers, supervisor(s), close friends, previous work colleagues, partners from other organizations, etc. Information associated with one or more persons of interest to the user may then be selected and retrieved from a cache storage at a server by a productivity service to be provided to a client application for display to the user. Information to be stored in server cache for rapid retrieval may also be selected based on user and relevant person context using observed user behavior. In some embodiments, people cards may also be used to show contextualized data about people being displayed before the viewing user uses the data.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, virtual or augmented reality devices, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide context and social distance aware fast live people cards. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1B:
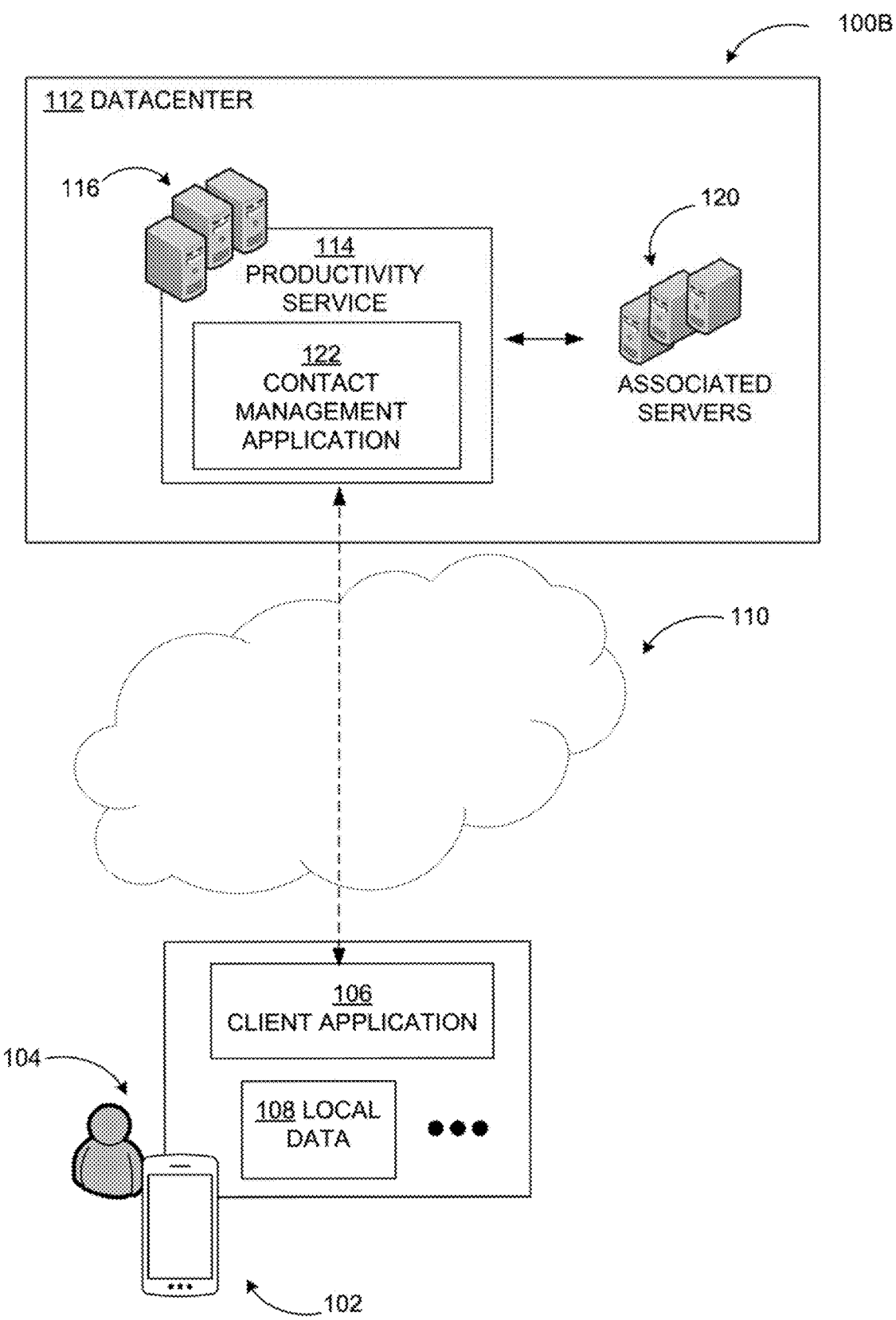
Figure 1C:
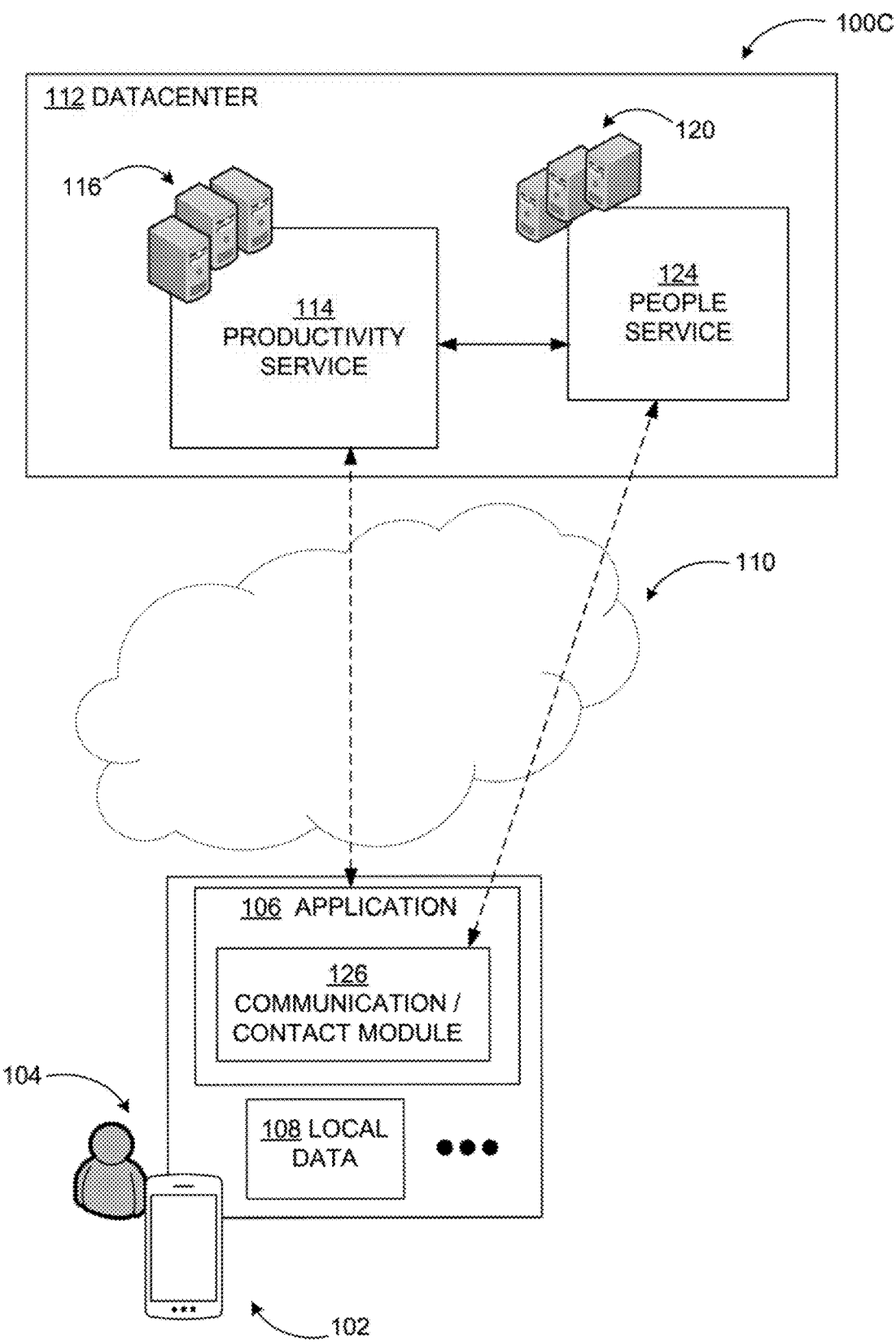

FIG. 1A-1C include display diagrams illustrating example network environments where context and social distance aware fast live people cards may be implemented. As illustrated in diagrams 100A-C, an example system may include a datacenter 112 hosting a cloud-based productivity service 114 configured to enable users to create, edit, and/or share content among multiple devices and across a variety of platforms. The datacenter 112 may include one or more processing servers 116 configured to execute the productivity service 114, among other components. The datacenter 112 may also include one or more associated servers 120 configured to execute related applications, manage one or more data stores comprising data associated with the productivity service 114, and perform other tasks. As described herein, the productivity service 114 may be implemented as software, hardware, or combinations thereof.

In some embodiments, the productivity service 114 may be configured to interoperate with various applications. For example, as illustrated in the diagrams 100A-B, a user 104 may execute a thin (e.g., a web browser) or a thick (e.g., a locally installed client application) version of an application 106 through a device 102 with which the productivity service 114 may be configured to integrate and interoperate with over one or more networks, such as network 110. The application 106 may be an application hosted by the productivity service 114. The application 106 may be configured to provide a user interface allowing the user 104 to interact with various applications under the umbrella of the productivity service. For example, diagram 100A shows a communication application 118 as part of the productivity service 114. User 104 may be enabled to communicate with other users in various modalities via the application 106 and the communication application 118. As part of the communication services, information associated with people may be stored and provided to the user 104. In some embodiments, the information may be provided in form of people cards that contain actionable content such as addresses that can include links to a mapping application, email addresses that may open an email user interface, phone numbers that may activate a phone call session, and many more. Data associated with the communication application 118 may be stored as local data 108, at the servers of the productivity service 114, or at associated servers 120.

The application 106 may be a communication application, a calendar application, a word-processing application, a notebook application, and/or a spreadsheet application among other examples. The device 102 may include a desktop computer, a laptop computer, a tablet computer, a vehicle mount computer, a smart phone, or a wearable computing device, among other similar devices. A communication interface may facilitate communication between the productivity service 114 and the application 106 over the network 110.

In some embodiments, people cards may display different data based on context user's application location such as collaboration service, web-based communication application, communication service client, cloud storage service, etc. People card configuration or content may also be determined based on whether or which organization the user belongs to, whether he/she is viewing their own card, their working hours, previous interactions, and similar parameters. Selection of the data to be displayed may be further based on social distance showing the more relevant data to introduce a person on a card to a user if they do not know each other, or rendering the more useful data if they are close colleagues.

To provide fast rendering of the live people cards, a backend service may be provided that is configured to decide which data is the more relevant for a user based on provided context from a client application and social distance determined by one or more sources. The backend service may include a fast-access storage for prefetching and caching the data for people cards, so they can be rendered fast. Client applications may be configured to predict the user's behavior and send according signals to the backend service so that the backend service (referred to as "people service" herein) pre-fetches the data that is likely to be requested by a user in advance.

Diagram 100B of FIG. 1B shows another configuration, where a contact management application 122 may be part of the productivity service 114 and provide people data to the user 104 through the client application 106. The contact management application 122 may retrieve data from various internal and external resources (within the productivity service environment or other services such as social networks, professional networks, etc.)

Diagram 100C of FIG. 1C shows yet another example configuration, where the application 106 includes a communication and/or contact module 126 in conjunction with the productivity service 114. The communication and/or contact module 126 may communicate with people service 124 executed on servers 120 and provide fast, live people card information to the user 104. As discussed above, the people service 124 may include a fast-access storage for prefetching and caching the data for people cards, so they can be rendered fast. The communication and/or contact module 126 may be configured to predict the user's behavior based on usage and other factors and send according signals to the people service 124 so that the people service 124 pre-fetches the data that is likely to be requested by the user 214 in advance.

Some of the actions and/or processes described herein have been illustrated from the perspective of a server (for example, the processing servers 116 configured to execute the productivity service 114), however similar actions may be performed similarly by a client (for example, the application 106), among other entities.

As discussed, prioritization, retrieval, and presentation of people information in an efficient and user-friendly manner may be a challenge. Embodiments, as described herein, are directed to context and social distance aware fast live people cards. Context and social distance aware fast live people cards may improve performance, reduce processing and network bandwidth usage, and improve user interaction.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with user communication through productivity services hosted across a variety of platforms and devices.

Figure 2:
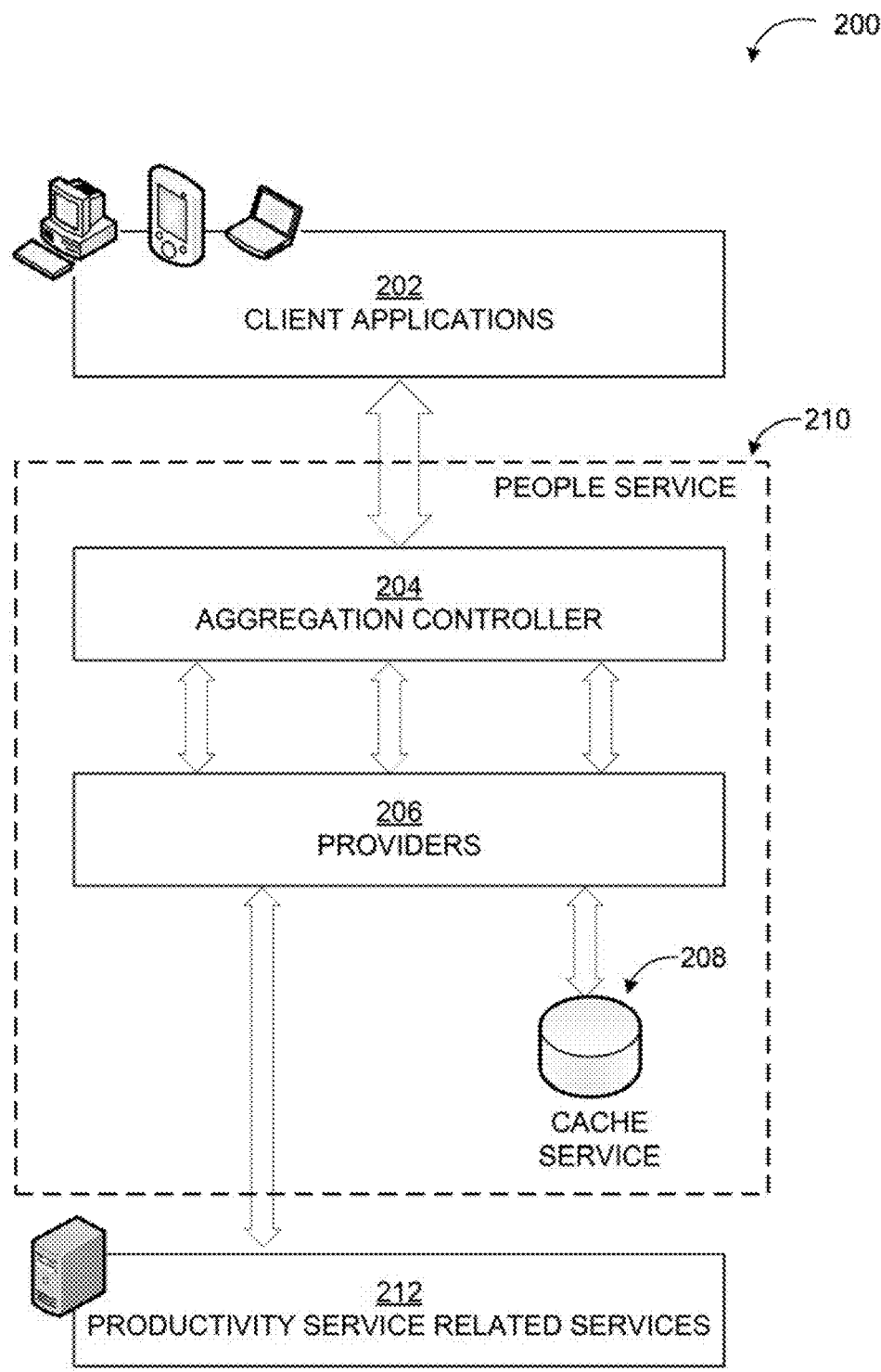
FIG. 2 includes a display diagram illustrating an example people service architecture to provide context and social distance aware fast live people cards.

FIG. 2 includes a display diagram illustrating an example people service architecture to provide context and social distance aware fast live people cards.

Diagram 200 includes an example architecture of a people service to enable various kinds of data associated with people cards to be retrieved and provided to the user rapidly when needed. The people service 210 may reside between client applications 202 and other services such as productivity service related services 212 to retrieve and provide people card data. The people service may expose a standardized or proprietary interface for communication with client applications 202. For example, the people service 210 may provide a representational state transfer (REST) interface and/or websockets that allow requesting systems to access and manipulate textual representations of web resources using a uniform and predefined set of stateless operations.

In some embodiments, the people service 210 may include the logic to determine portions of data to be retrieved and provided to the client applications 202. The client applications 202 may provide some properties to the people service 210, and the people service 210 may determine user and relevant person context, social distance, and other factors based on the properties, and retrieve data likely to be requested by a user. The data may be cached by the people service for rapid delivery to the user. Cache service 208 may be any server storage to provide rapid delivery to the client applications 202. For example, a one or more node/size multi-tier cache or in-memory cache that provides low-latency, high-throughput capabilities may be used. The data may be encrypted in some examples for security purposes.

In order to be fast client applications 202 may send pre-fetch requests to the people service 210 when they detect a user on a page when the page is being rendered. In other examples, a pre-fetch request may not be sent for all users, but for those users whose people cards, the viewing user is likely to request/view. The likely users may be determined through machine learning or similar techniques. The people service 210 may thereby have a chance to send requests to other services, which may be slow in responding and cache the received data in the cache service 208. Then, if the viewing user indicates interest (e.g., hovers over, looks at in a virtual reality environment, clicks using a mouse, or selects using a keyboard, etc.) in someone's name, picture, or similar content, the client applications 202 may send a request and the people service 210 may send the cached data back. The data may be sent in partial responses such that a client does not have to wait for the entire data to be ready and render received portions as they arrive.

The people service 210 that powers fast, contextual and intelligent people cards and people-centric experiences throughout a productivity service and related applications.

The people service 210 primarily manages the various tasks by smart pre-fetching, caching, and build-up of related data needed to power these experiences.

When the user experience at a client application detects that it needs data (e.g. user hovering on a person's name or picture), it sends a request to the people service 210 that it needs information for the desired person. Some of the data may be delivered very quickly due to its very static nature such as display name, email address, etc. Other portions of the data such as computed relationships may also be retrieved quickly. However, there may be portions of data that change often and need to be requested from another resource such as recently modified documents. The people service 210 may work in tandem with the user experience to accommodate fast delivery of different people data types.

In some examples, the user experience may provide context information in the request call(s) to the people service, which may use the context information to predict what kind of information the user is likely to want. For example, a filtered set of documents may be provided if the user is making the request from a specific collaboration service site. In a more complex example, relationships may be presented when viewing a person on a meeting invite in a communication application/service. The people service 210 may intelligently decide based on user context and the person in focus which data to show in which experiences. Feedback from client applications 202 may be used to increase an accuracy of inferences made by the people service 210.

Context may be provided as predefined data type such as a string identifier of the workload/scenario and a list of key/value properties. In an example implementation, client applications may inform the people service 210 that there are people in the user experience that may be requested later. For example, a communication application may submit a call to the people service whenever it draws a new mail message about the people in the To: and CC: lines. This may enable the people service 210 to start pre-fetching data, warming up caches, and computing relationships and insights as appropriate.

An aggregation controller 204 within the people service 210 may orchestrate calls from the client applications 202 and data to be returned to the client applications 202. In some cases, the aggregation controller 204 may use context to determine which providers 206 to call, and in other cases the context may be passed to the providers 206 for further use. The providers 206 may individually know about a particular data domain and how to pre-fetch and cache information. As a specific example, a basic user information provider may know how to fetch and cache core information about people entities such as display name, phone number, email address, etc. Providers 206 may set a particular caching strategy based on their individual domain knowledge. For example, documents may have a much shorter time to live (TTL) than basic user information because the document tend to change and may be requested less frequently than basic user information.

Providers 206 may also be implemented to have smart logic by using context to return different information. For example, a modified documents provider may use a current collaboration site information to scope queries to that particular site as needed. In other cases, providers may pass the context to a further underlying system such as an organizational database or a graph based relation application providing a graph based on interactions between users and entities in a workspace or similar environment (for example, documents, emails, etc.). The more a user interacts with someone, or with a person in someone's team, the higher the weight of the edge between the user and that person may become. This kind of data may be used to decide social proximity and to contextualize the data. Cache service 208 may include a number of different caching types as described previously. Data in the cache service 208 may be secured through encryption and encryption key rotation.

As mentioned above, the people service 210 may pre-fetch and cache data depending on the type of data for future requests. Various types of data may be defined for pre-fetching and caching strategies. An example type may be Global/Tenant wide visible data such as user profile data like name, telephone number, photo; organizational chart information; communication status messages; etc. Another example type may be personal views of data such as a person's view of their own or another person's documents, emails, and calendar events. In some cases, a performant cache technology with access control list (ACL) may be used to optimize for enhanced cache hit ratio.

In some embodiments, a partitioning model may be implemented to determine how people data is pre-fetched and how it is cached. For example, public/tenant wide data may be cached in a cache aside pattern. To enhance performance triggers may be used to initiate cache warmup. Data may be kept in cache using a time to refresh "TTR" cache update model. A TTR timestamp token may be used to determine if data in the cache should be re-fetched from the backend to ensure future consistency. Depending on the type of data and its update frequency the TTR may vary. The timing for TTR may be optimized based on the data. The people service 210 may also support marking of data as dirty from the client applications so that client applications can indicate changes if needed. For example, updating a property in a person's profile may mark the cache as dirty.

Because of low probability of having cache hits on personal view data in practical implementations, this type of data may be maintained in the cache for a relatively short time. The primary purpose for caching this type of data may be to secure a low latency for this kind of data if it is requested by the user. The people service 210 may start with a cache ahead pattern also in this case, but instead of a TTR, a TTL may be used. The TTL may be defined depending on available resources such as cache size, a balance between backend load and memory usage, etc.

Figure 3:
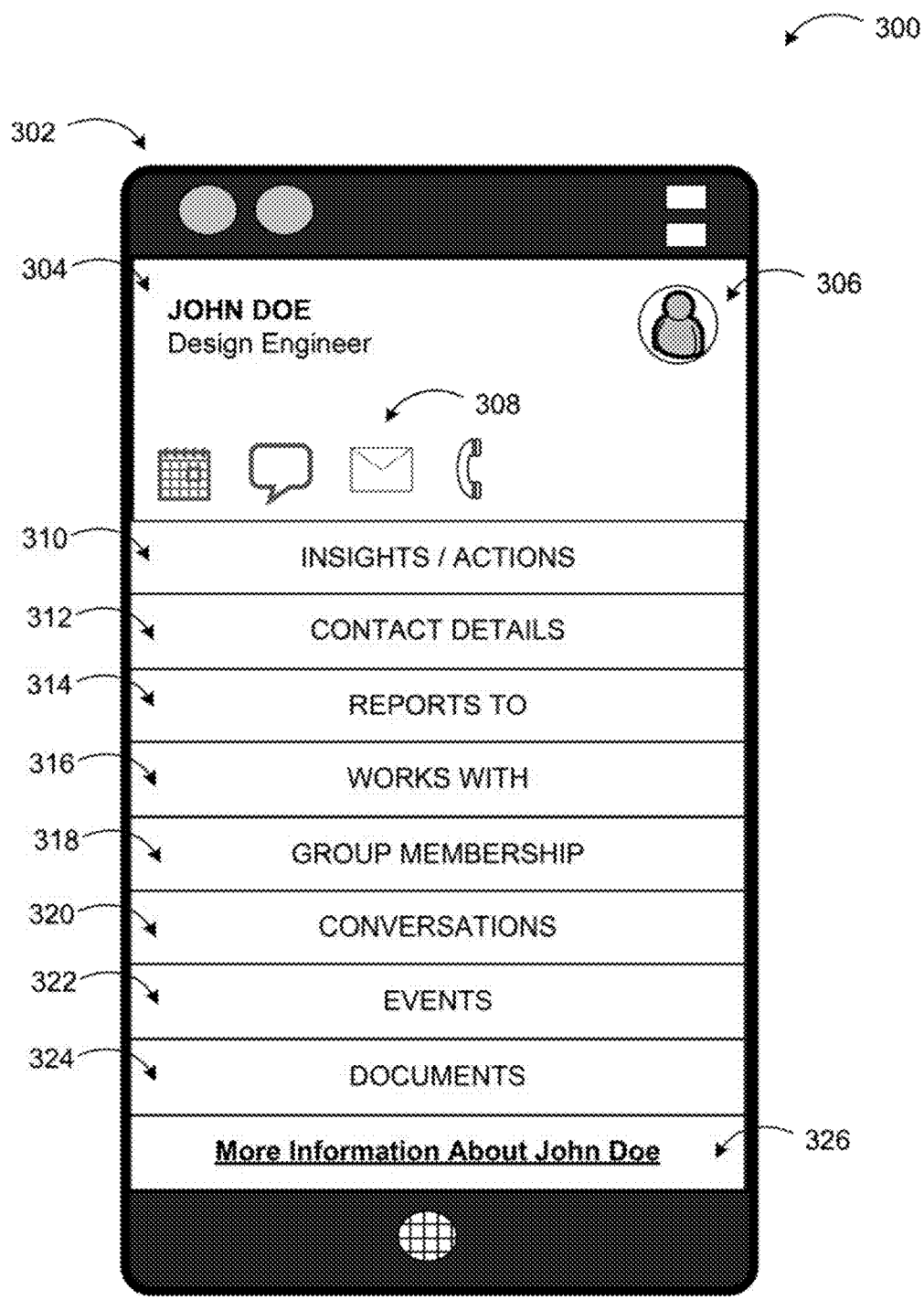
FIG. 3 includes a display diagram illustrating an aggregated example of a context and social distance aware live people card.

FIG. 3 includes a display diagram illustrating an aggregated example of a context and social distance aware live people card.

Diagram 300 shows a productivity application user interface on a mobile device 302 platform. Embodiments may be implemented on any device, operating system, or application platform. The productivity application may be a communication application, a calendar application, a contact management application, or similar ones and may provide segmented or combined functionality such as functionalities of the individual applications. The example user interface presents an identity 304 of the user along with a picture 306 of the user. The displayed user may be the user executing the application or it may be a person that the user is interested in. Various icons 308 may provide quick access to different functionalities such as a calendar, a messaging function, an email function, a call function, etc.

Example user interface also displays a number of illustrative people data groups that may be presented to the user. These may include insights and actions 310, contact details 312, organizational relationships such as "reports to" 314 or "works with" 316, group memberships 318, conversations 320, events 322, and documents 324. Additional information about the user may be accessed through a link 326. The people data groups that may be displayed are not limited to the illustrative examples above. For example, work experience, skills, endorsements, attachments, or current activity (in various productivity applications) may also be presented as distinct groups.

The people information may be presented in form of people cards. In some examples, a condensed version such as short versions of the different groups may be presented first and a selected group may be expanded to present additional, detailed data occupying a portion of or an entire display. Depending on user context, user preferences, and platform properties (such as available display area) selected groups may be displayed instead of all available groups.

FIG. 4A-4H include display diagrams of example live people cards displaying various categories of information.

Figure 4A:
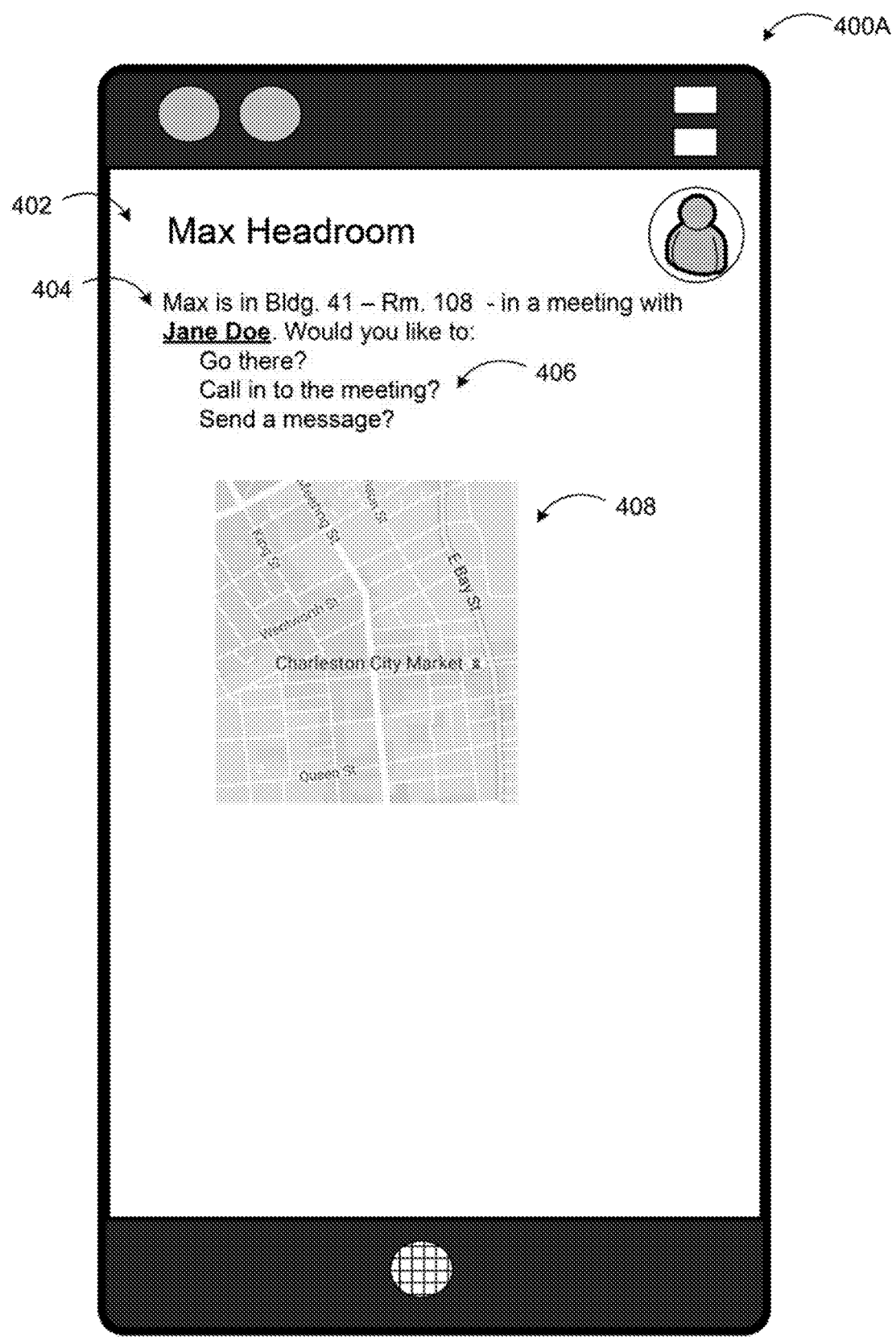
FIG. 4A-4H include display diagrams of example live people cards displaying various categories of information.

Diagram 400A of FIG. 4A shows an example detailed view of an insights and actions group. The insights and actions group view may provide, in addition to the person's identity 402, location and a status (404) of the person may be displayed along with suggested actions 406 such as assistance with getting to the location, calling into the meeting, sending the person a message, etc. A map 408 of the location may also be displayed. Further insights or actions may include the person's recent activities, collaborated or viewed documents, actions to collaborate with the person, and others. The content to be displayed may be selected and configured based on user context and relevance of the person to the user. For example, the insights or suggested actions may be selected based on which application environment the user is requesting the person's data from or how close an organizational relationship or social distance from a graph based relationship application is. Furthermore, the displayed insights and actions may be interactive, that is, applications may be launched based on user selection, additional information may be displayed, etc. For example, the map may change into a set of directions if the user selects the option to go to the person's location.

Figure 4B:
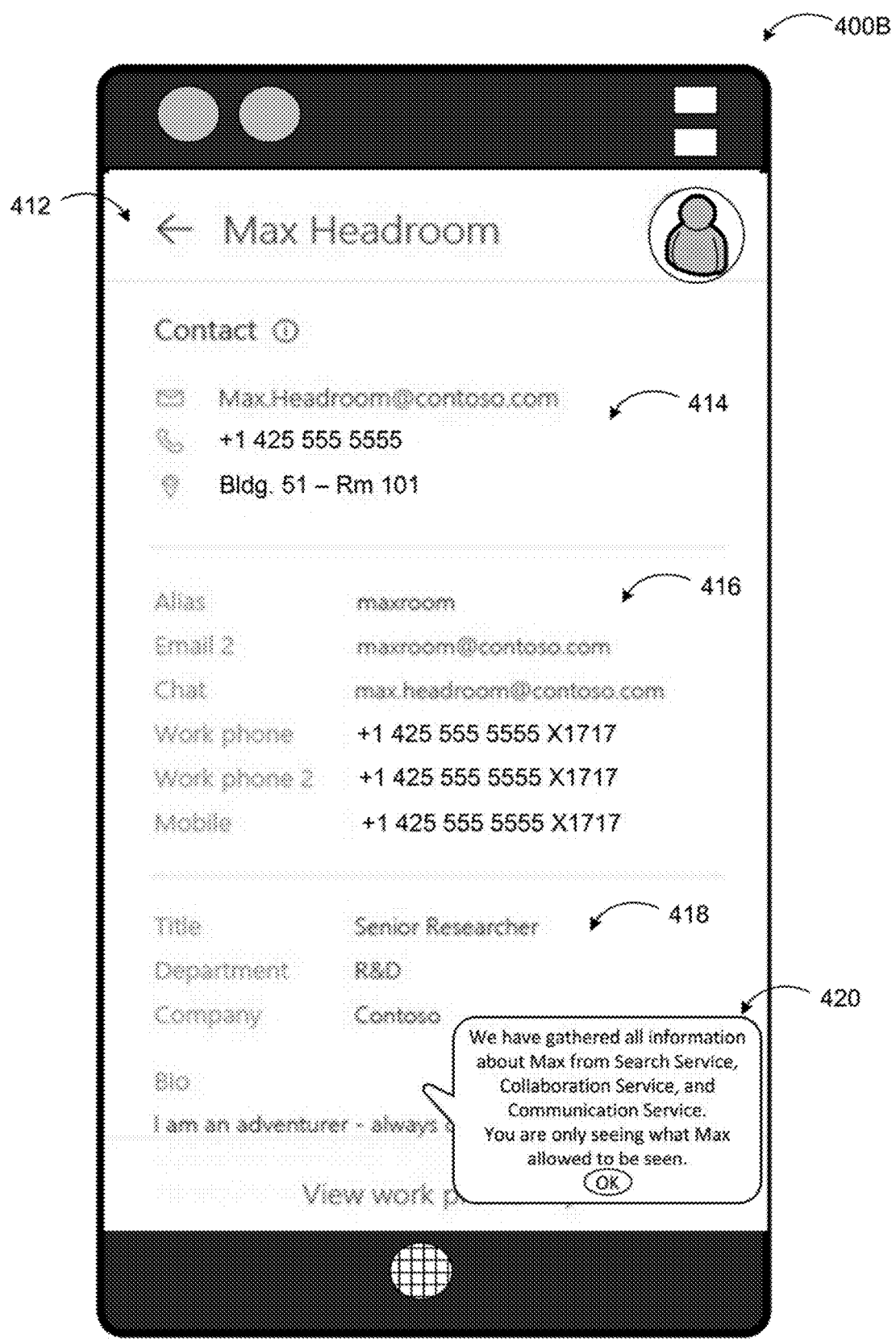

Diagram 400B of FIG. 4B shows a contact details group 412 of people information. In addition to the person's name and picture (or icon representing the person), top level contact information 414 including a main email address, phone number, and office location (or similar information). Secondary level contact information 416 may include secondary email addresses, messaging address (if different), other phone numbers for the person, etc. Background information 418 may include title, organizational position, organization, etc.

Message 420 displayed in conjunction with the contact details group 412 is indicative of another aspect of some embodiments related to privacy and security. Users may define in various platforms which portion of their personal information can be shared with or displayed to other people. A people service according to embodiments may comply with the user preferences and limit displayed information to what the owner of the data allows. In such scenarios, message 420 may be displayed to inform a viewing user that there may be more information associated with the person.

Figure 4C:
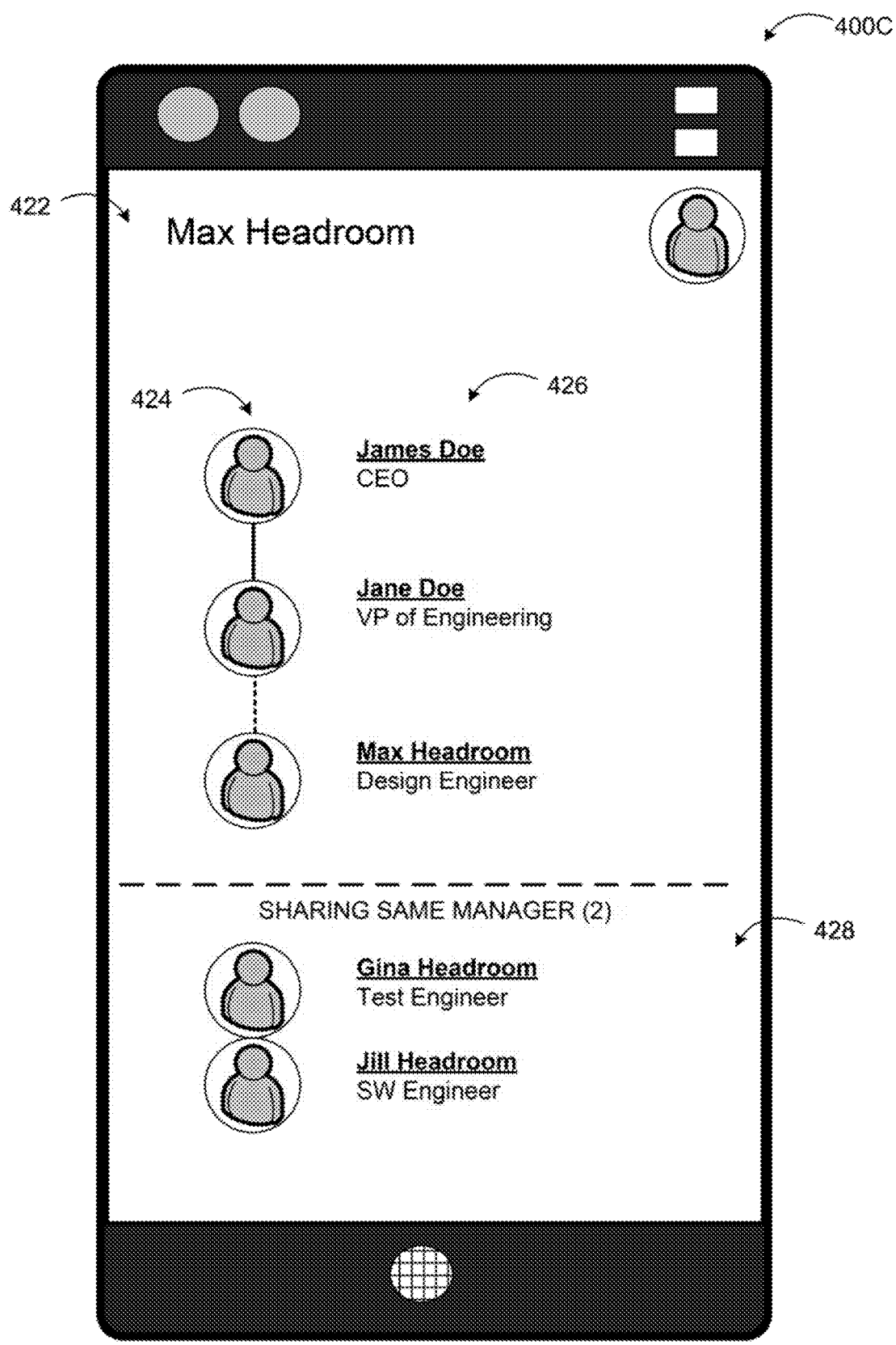

Diagram 400C of FIG. 4C shows a reports to group 422, which includes an organizational chart 424 showing the person's position within his/her organization and their supervisor(s) 426. In some embodiments, a "sharing same manager" section 428 may also be displayed presenting other people within the same organization that report to the same manager as the person since these people may be of interest to the viewing user.

Figure 4D:
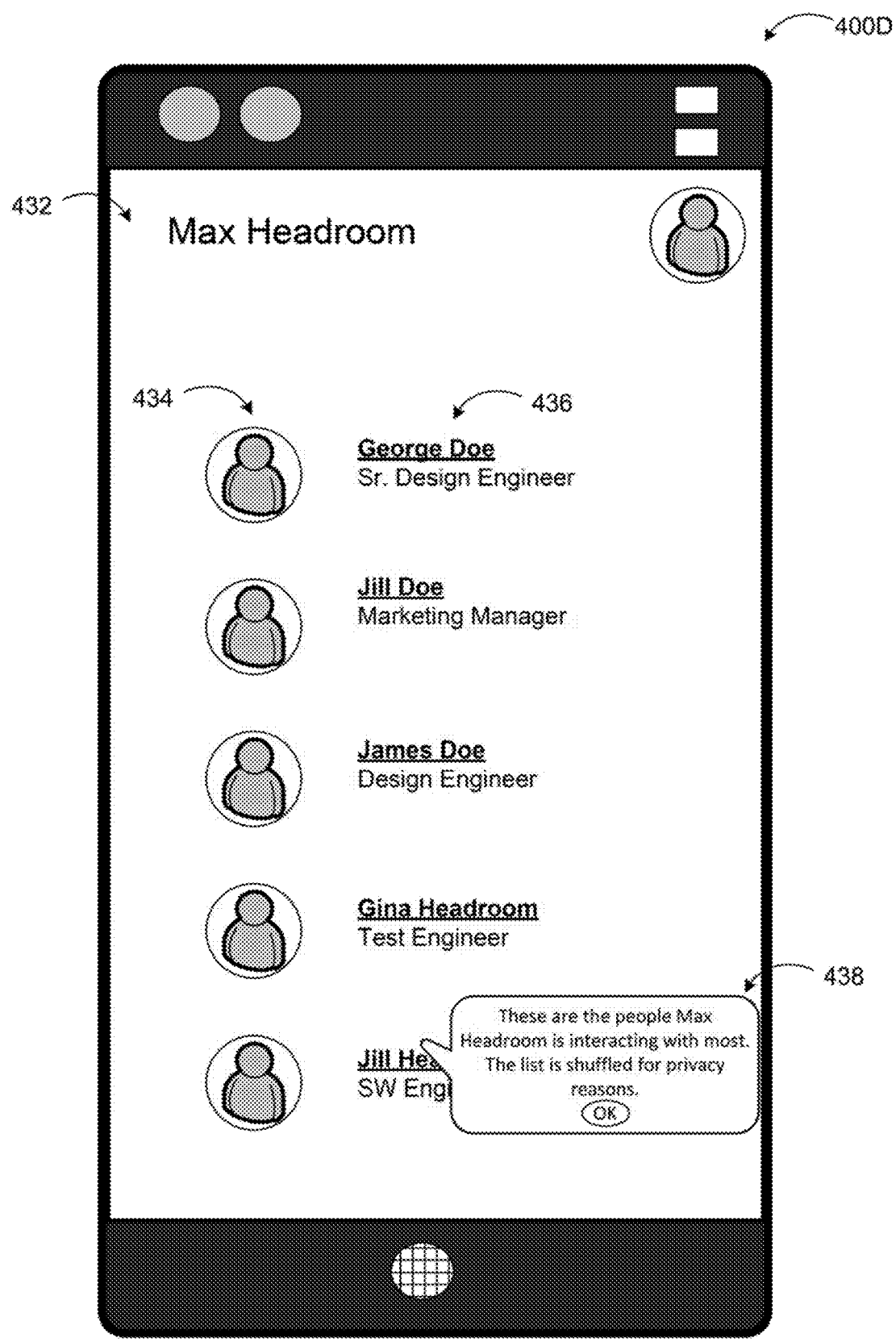

Diagram 400D of FIG. 4D shows a works with group 432, which includes representations 434 (i.e., pictures or icons) of the person's peers and their information 436. If the number of the person's peers is large, the group view may be scrollable or a select group may be displayed on the people card. If a portion of the person's peers are displayed on the people card, a message 438 may be displayed indicating the criterion used to select the displayed peers. Furthermore, the peers displayed on the people card may be randomly ordered in some cases to prevent release of interaction frequency information between people.

The information displayed in the people cards of FIG. 4A through 4D (and the following figures) may be actionable, that is, each piece of information may include a link to further information or activate an application (e.g., a communication application, a mapping application, etc.) providing the viewing user with an enhanced user experience.

Figure 4E:
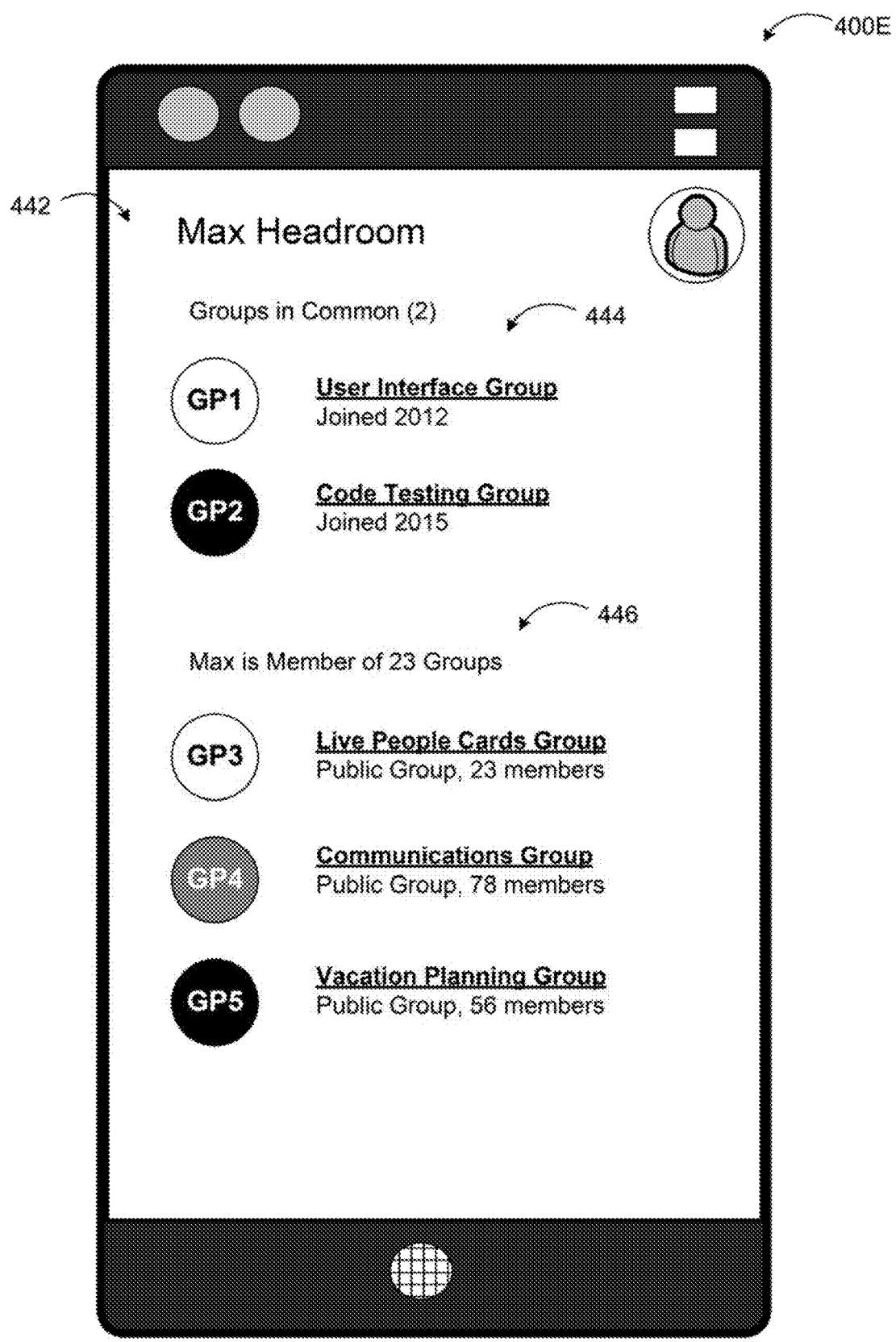

Diagram 400E of FIG. 4E shows a group membership 442 people card that includes a listing 444 of groups to which the person and the viewing user belong together and a listing 446 of the groups to which the person belongs. Brief information such as when the person joined a group, a number of members of each group, whether the group is public or private, etc. may also be displayed. Furthermore, links may be presented to access group discussion sites, documents, conversations associated with each group, etc.

Figure 4F:
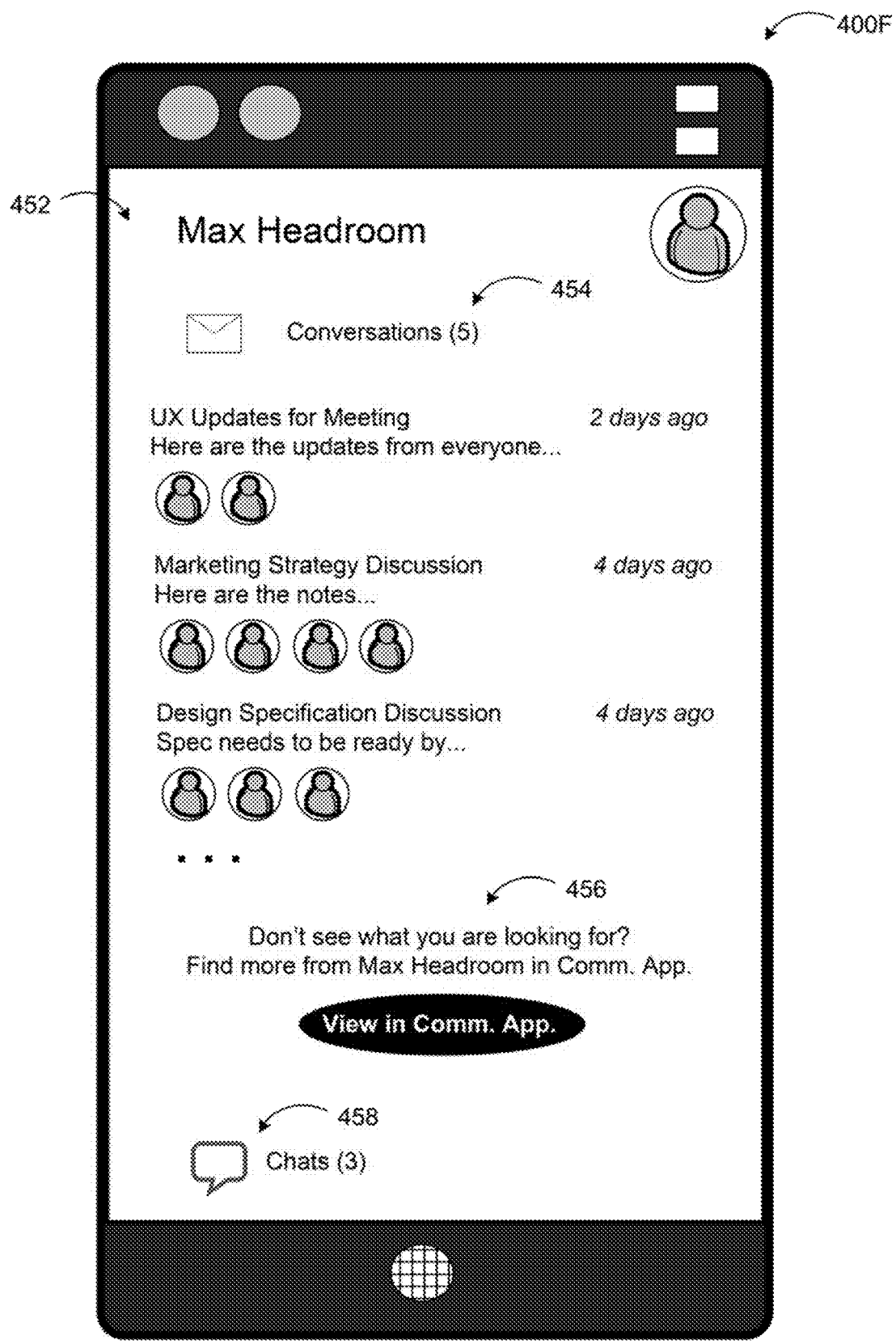

Diagram 400F of FIG. 4F shows a conversation group 452, where conversations 454 in which the person participated may be listed. Each listing may include a title, a summary content, listing or representations of participants, timing information, and other relevant information. Each listing may also include a link to access the conversation. If more conversations are detected than can be displayed, a link 456 may be presented to activate a communication application and search or view all available conversations. The conversations may be selected and/or ordered according to a relevance to the viewing user. For example, if a conversation includes the viewing user or involves a project common with the viewing user, that conversation may be selected for display or ordered higher in the displayed listing.

In some embodiments, conversations may be grouped based on modality such as email conversations, messaging conversations (chats 458), etc. In other embodiments, conversations that span across multiple modalities may be presented in mixed form. Privacy and security preferences of conversation participants may also be respected, where exchanges and other information not desired to be shared with everyone may not be displayed unless the viewing user has the proper permissions.

Figure 4G:
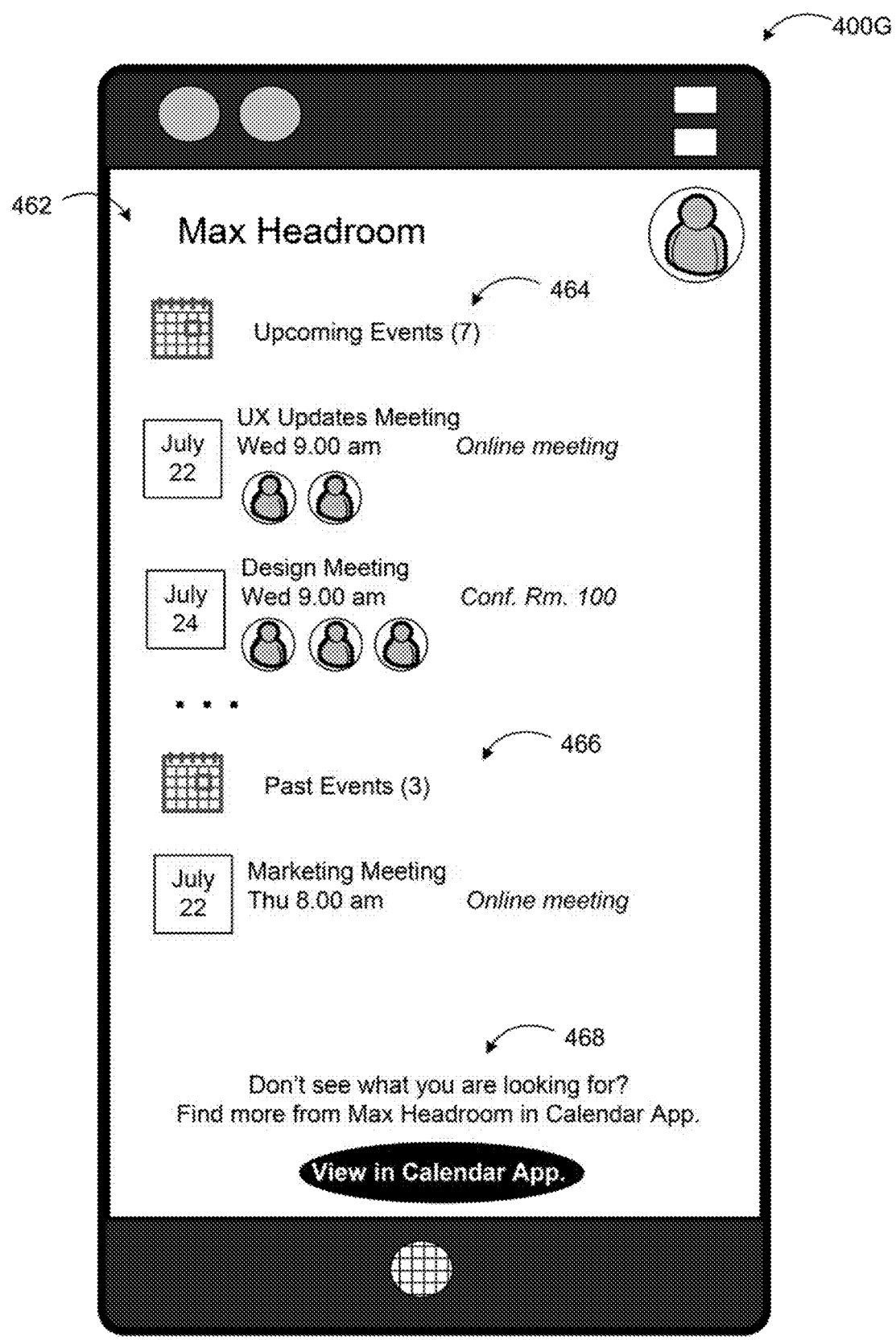

Diagram 400G of FIG. 4G shows an events group 462 displaying calendar events relevant to the viewing user in conjunction with the person whose people card is being displayed. These events may include meetings in common with the viewing user, meetings involving a project in common with the viewing user, appointments or tasks with similar relevance, etc. In some embodiments, the events may be further grouped as upcoming events 464 and past events 466. A link or control 468 to activate a calendar application may be provided to search for or view further events that may be relevant to the viewing user.

Figure 4H:
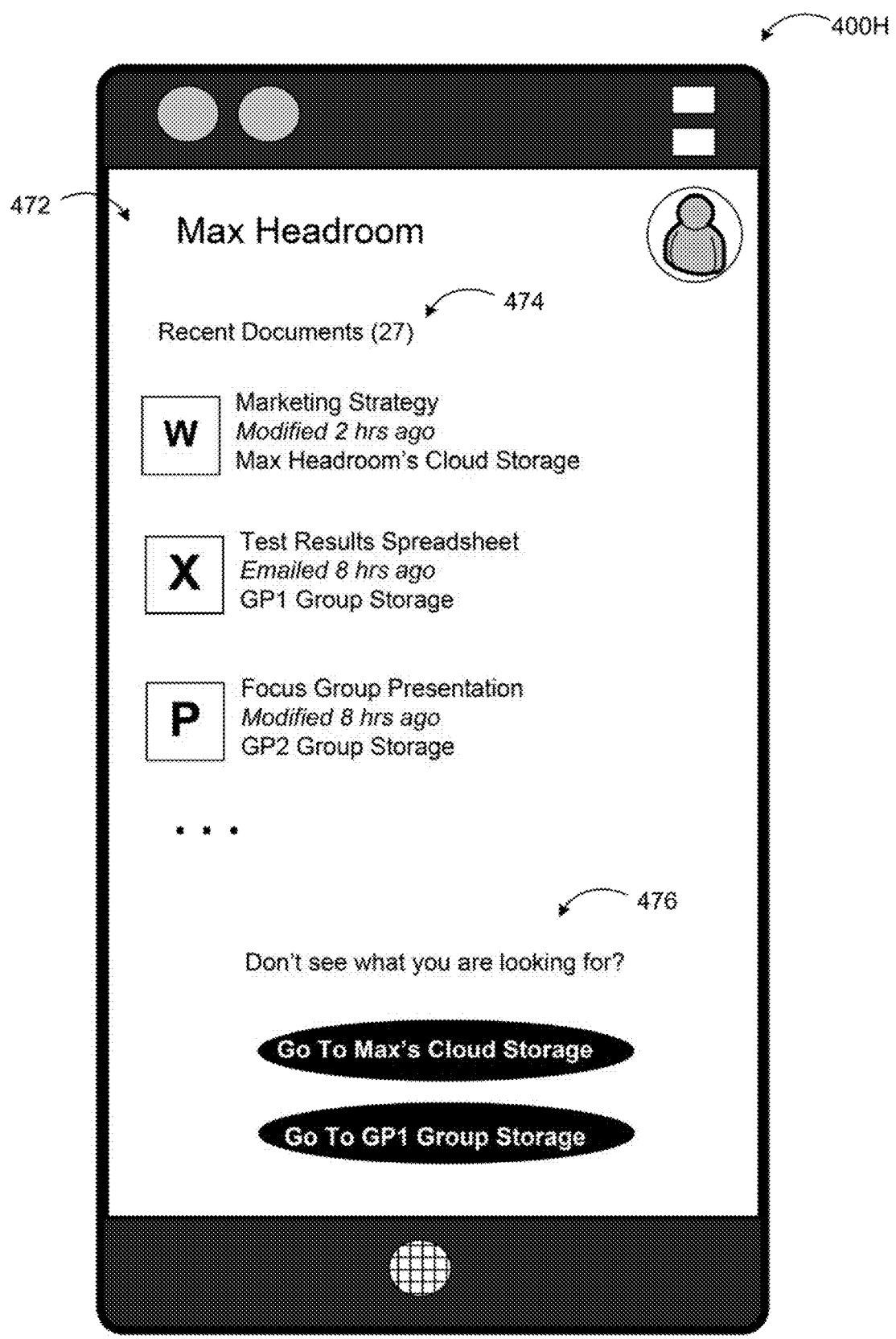

Diagram 400H of FIG. 4H shows a documents group 472 associated with the person whose people card the viewing user is looking at. The group may include a listing 474 of recent documents relevant to the viewing user (e.g., collaborated on, shared with, etc.) with summary information such as title, most recent action involving the document, storage location, etc. The view may also include links or controls to different storage locations 476 such as the person's cloud storage or a group storage site for searching and viewing additional relevant documents.

As mentioned above, the groups, details in each group view, and an order of listed information may be selected based on a number of criteria such as user context and relevance of the person (and the information) to the viewing user. Following are some example scenarios. If a person on a card is a close colleague of the viewing user, then seeing his/her manager and org chart may not be that interesting because the viewing user already knows the information. However, the person's latest modified documents or common emails/meetings may be more interesting to the viewing user. On the other hand, if a person on a people card is a stranger, then the viewing user may be interested in the org chart to understand the person's position in the organization. Contact details may be relevant as well. If the viewing user is viewing the people card through an email client application, then the conversations and meetings may be ordered higher in the listings. If the viewing user in starting from a cloud storage application, the documents group may be prioritized in display. The filtering of the displayed content may also be based on the user context or relevance to the user. For example, if the viewing user in on a collaboration site, the documents displayed within the documents group may be selected based on their location on the site. If the viewing user is looking at their own people card, the people service may suggest an edit action as the top suggestion since that is the likely scenario. Another example scenario for selection of presented actions and options may include the viewing user's working hours. If the time is within the person's working hours, various modalities of communication including video conference may be presented to the viewing user. However, if it is outside the working hours, the viewing user may be presented with a phone call or email as top options.

The examples provided in FIG. 1A through FIG. 4H are illustrated with specific systems, services, applications, modules, and user experiences. Embodiments are not limited to environments according to these examples. Context and social distance aware fast live people cards may be implemented in environments employing fewer or additional systems, services, applications, modules, and user experiences. Furthermore, the example systems, services, applications, modules, and user experiences shown in FIG. 1A through FIG. 4H may be implemented in a similar manner with other values using the principles described herein.

Figure 5:
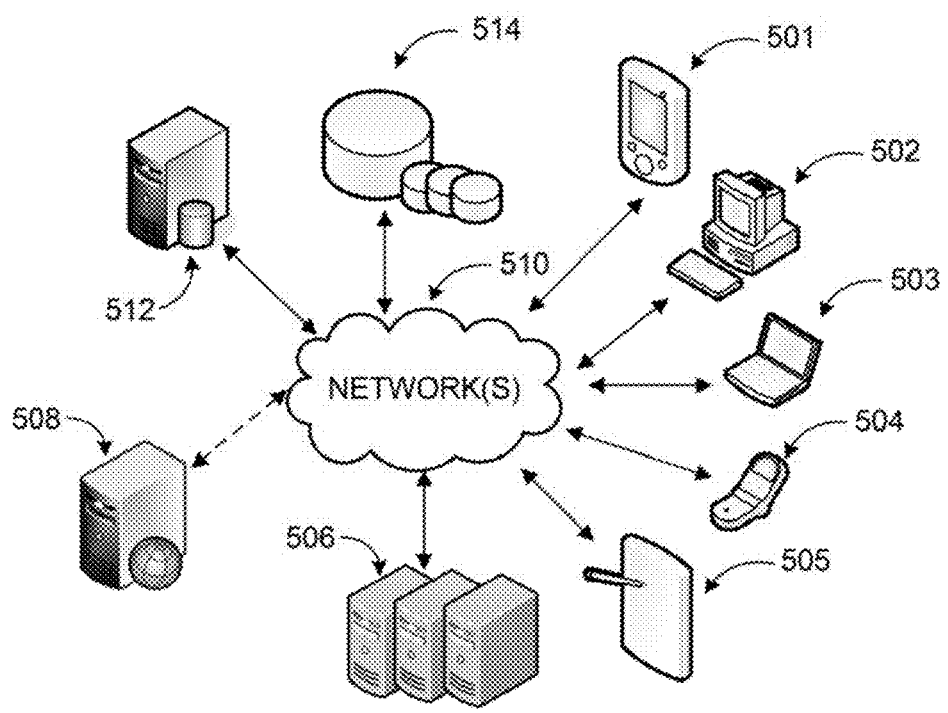
FIG. 5 is an example networked environment, arranged in accordance with at least some embodiments described herein.

FIG. 5 is an example networked environment, arranged in accordance with at least some embodiments described herein. In addition to locally installed applications (for example, client application 106), context and social distance aware fast live people cards may also be provided in conjunction with hosted applications and services (for example, people service 124) that may be implemented via software executed over one or more servers 506 or individual server 508, as illustrated in diagram 500. A hosted service or application may communicate with client applications on individual computing devices such as a handheld computer 501, a desktop computer 502, a laptop computer 503, a smart phone 504, a tablet computer (or slate) 504, ('client devices') through network(s) 510 and control a user interface presented to users.

Client devices 501-504 are used to access the functionality provided by the hosted service or application. One or more of the servers 506 or server 508 may be used to provide a variety of services as discussed above. Relevant data may be stored in one or more data stores (e.g. data store 514), which may be managed by any one of the servers 506 or by database server 512.

Network(s) 510 may comprise any topology of servers, clients, Internet service providers, and communication media. A system according to embodiments may have a static or dynamic topology. Network(s) 510 may include a secure network such as an enterprise network, an unsecure network such as a wireless open network, or the Internet. Network(s) 510 may also coordinate communication over other networks such as PSTN or cellular networks. Network(s) 510 provides communication between the nodes described herein. By way of example, and not limitation, network(s) 510 may include wireless media such as acoustic, RF, infrared and other wireless media.

Many other configurations of computing devices, applications, engines, and modules may be employed to provide context and social distance aware fast live people cards. Furthermore, the networked environments discussed in FIG. 5 are for illustration purposes only. Embodiments are not limited to the example services, applications, engines, modules or processes.

Figure 6:
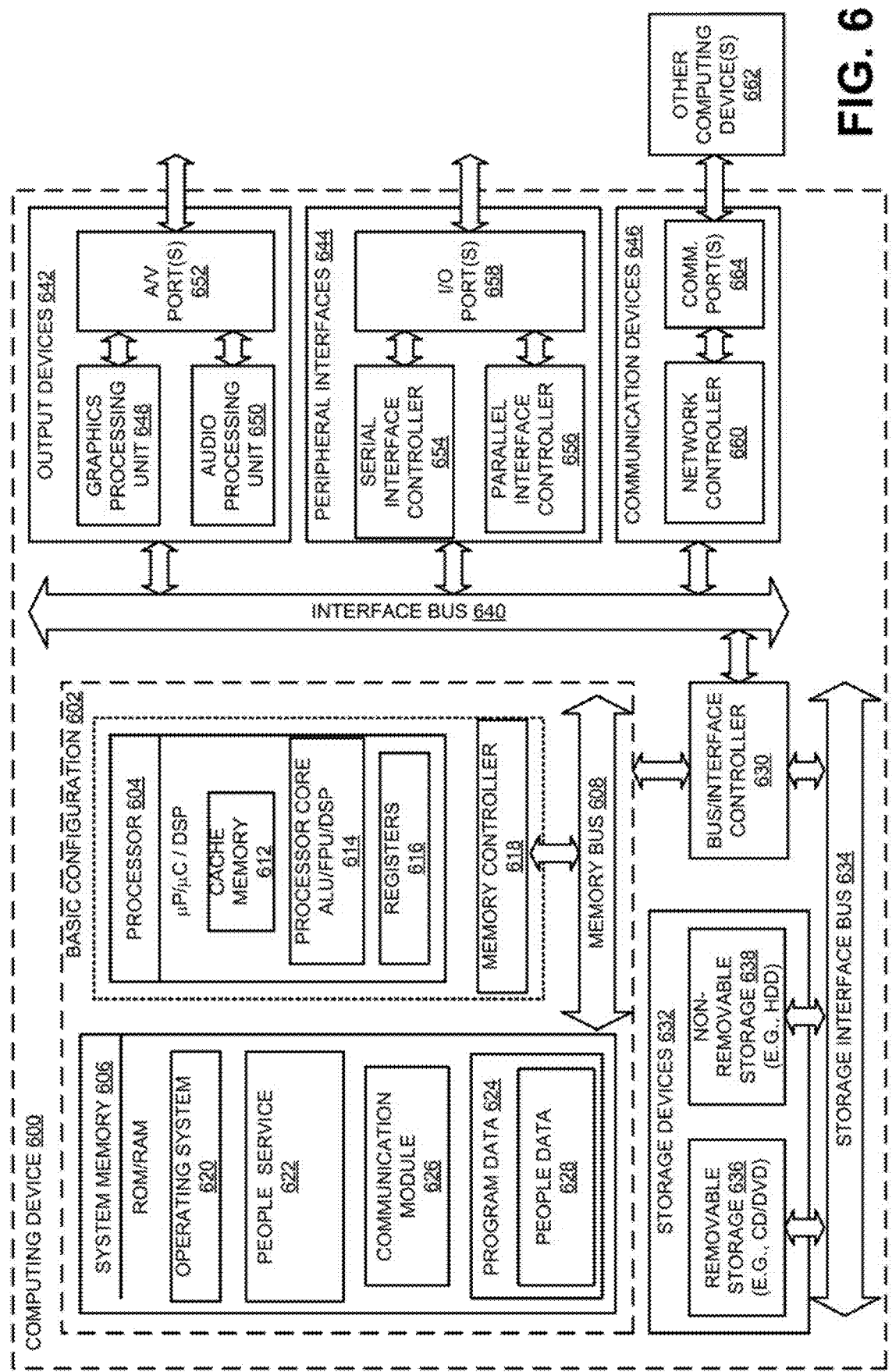
FIG. 6 illustrates a general purpose computing device, which may be configured to provide context and social distance aware fast live people cards, arranged in accordance with at least some embodiments described herein.

FIG. 6 illustrates a general purpose computing device, which may be configured to provide context and social distance aware fast live people cards, arranged in accordance with at least some embodiments described herein.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communicating between the processor 604 and the system memory 606. The basic configuration 602 is illustrated in FIG. 6 by those components within the inner dashed line.

Depending on the desired configuration, the processor 604 may be of any type, including but not limited to a microprocessor ($\mu$P), a microcontroller ($\mu$C), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, a people service 622, and program data 624. The people service 622 may work together with a communication module 626 in determining user context and/or a relevant person context in response to detecting a user interest in viewing contact information. The user context may include user's attributes such as organizational position, preferences, location, working hours, which application the user is employing, etc. Relevant person context may include context information (similar to the user's) for people within a predefined social distance such as the user's peers, supervisor(s), close friends, etc. Information associated with one or more persons of interest to the user may then be selected and retrieved from a cache storage at a server a productivity service to be provided to a client application for display to the user. Information to be stored in server cache for rapid retrieval may also be selected based on user and relevant person context using observed user behavior. The program data 624 may include, among other data, people data 628, as described herein.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 646 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer that includes any of the above functions. The computing device 600 may also be implemented as a personal computer including both laptop computer and non-laptop computer configurations.

Example embodiments may also include methods to provide context and social distance aware fast live people cards. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
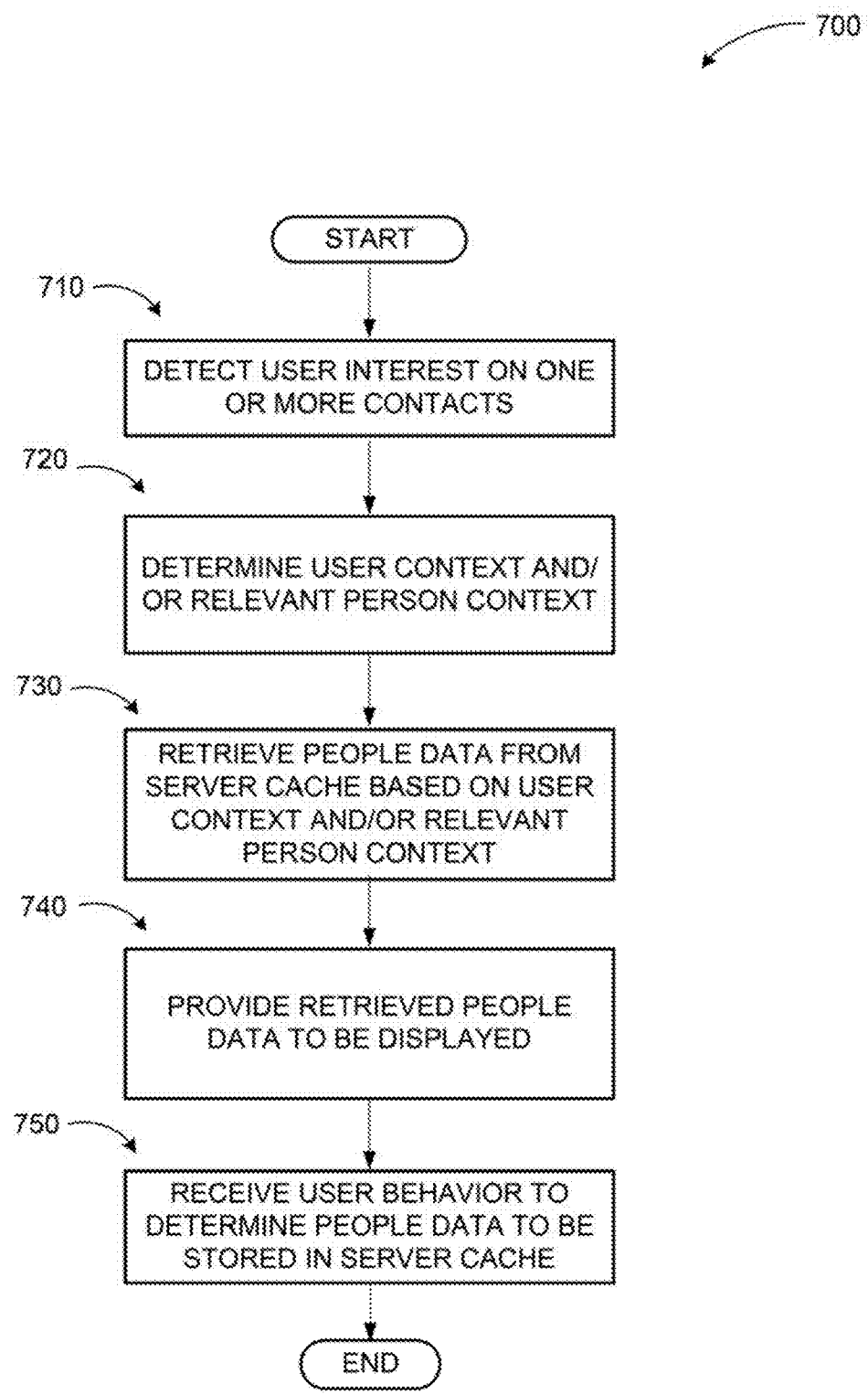
FIG. 7 illustrates a logic flow diagram for an example process to provide context and social distance aware fast live people cards.

FIG. 7 illustrates a logic flow diagram for an example process to provide context and social distance aware fast live people cards, arranged in accordance with at least some embodiments described herein.

Process 700 may be implemented on a computing device, server, or other system. An example system may include a communication interface configured to facilitate communication between a people service and a communication or productivity service and/or their applications, a memory configured to store instructions, and one or more processors coupled to the memory and configured to provide context and social distance aware fast live people cards.

Process 700 begins with operation 710, where a user interest on one or more contacts (people) may be detected. The user interest may be detected through detection of hovering action by the user over people's information, the user selecting one or more people, opening a document or communication associated with the people, etc. At operation 720, user context and/or relevant person context may be determined for the people of potential interest to the user. The user context may include user's attributes such as organizational position, preferences, location, working hours, which application the user is employing, etc. Relevant person context may include context information (similar to the user's) for people within a predefined social distance such as the user's peers, supervisor(s), close friends, etc. Social distance as used herein is not limited to people that a user is directly connected with. For example, a person that is not part of the user's organization may send them an email. Data about that person may also be retrieved (from external resources such as social or professional networks) and displayed according to embodiments.

At operation 730, people data may be retrieved from a server cache based on the determined user context and/or relevant person context. Information that may be relevant to the user may need to be provided quickly to a client application to be displayed and consumed by the user. Thus, such information may be stored in a quick-retrieval server cache as opposed to other data stores, where retrieval of the data may take time. People data may include a wide range of information. Thus, not all information associated with a person may be stored in the server cache. Instead information that is found to be relevant to the user may be stored there. For example, if a number of documents have been shared between the user and a person in the past, documents determined to be more relevant may be stored in the server cache.

At operation 740, the retrieved people data may be provided to be displayed to the user and consumed such as through interactive user interfaces. At optional operation 750, observed user behavior may be received to determine people data to be stored in the server cache for rapid retrieval in the future.

The operations included in process 600 are for illustration purposes. Context and social distance aware fast live people cards may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some examples, a means for providing context and social distance aware fast live people cards is described. The means may include a means for determining one or more of a user context and a relevant person context in response receiving detection of a user interest in a person; a means for retrieving people data associated with the person including dynamic information stored in a server cache for rapid access; and a means for providing the retrieved people data to be displayed in form of one or more people cards, where the people data is selected and ordered for display based on the user context and the relevant person context.

According to some examples, a method to provide context and social distance aware fast live people cards is described. The method may include determining one or more of a user context and a relevant person context in response receiving detection of a user interest in a person; retrieving people data associated with the person including dynamic information stored in a server cache for rapid access; and providing the retrieved people data to be displayed in form of one or more people cards, where the people data is selected and ordered for display based on the user context and the relevant person context.

According to other examples, determining the user context may include determining one or more attributes of the user including the user's organizational position, a preference of the user, a location of the user, working hours of the user, and an application employed by the user. Determining the relevant person context may include determining one or more attributes of the person including the person's organizational position, a preference of the person, a location of the person, working hours of the person, and an application employed by the person. Determining the relevant person context may further include determining a social distance between the user and the person; and evaluating the one or more attributes of the person in light of the determined social distance.

According to further examples, the method may also include receiving user behavior information to determine relevant people data to be stored at the server cache for rapid retrieval. The method may further include receiving people data from a plurality of sources; and selecting a portion of the received people data to be stored at the server cache based on the received user behavior information and a social distance between the user the people associated with the received people data. The method may yet include grouping the people data to be displayed on the one or more people card according to categories.

According to some examples, the categories may include insights and actions, contact details, organizational information, peers information, group memberships, conversations, events, and documents. The method may also include selecting which groups of people data to display and an order of the groups of people data to display based on the user context and the relevant person context. The method may also include providing detailed content with a group of people data to be displayed in form of a people card in response to a selection of the group, and selecting the detailed content and an order of information within the detailed content to be displayed based on the user context and the relevant person context.

According to other examples, a computing device to provide context and social distance aware fast live people cards is described. The computing device may include a communication interface configured to facilitate communication; a memory configured to store instructions; and one or more processors coupled to the memory and configured to execute a people service. The people service may be configured to in response receiving detection of a user interest in a person from a client application, determine one or more of a user context and a relevant person context; retrieve people data associated with the person including dynamic information stored in a server cache for rapid access; provide the retrieved people data to be displayed in form of one or more people cards, where the people data is selected and ordered for display based on the user context and the relevant person context; receive user behavior information to determine relevant people data to be stored at the server cache for rapid retrieval; and select a portion of the relevant people data to be stored at the server cache based on the received user behavior information and a social distance between the user the people associated with the relevant people data.

According to yet other examples, the client application may be part of a hosted service. The hosted service may include one or more of a productivity service, a collaboration service, a cloud storage service, a communication service, and the people service. The received user behavior information may be in form of one or more calls. The people service may include an aggregation controller configured to employ user context to determine one or more people data providers to pass the one or more calls to. A storage strategy in the server cache may be determined by the one or more people data providers. The server cache may be a variable size, multi-tiered cache.

According to further examples, a method to provide context and social distance aware fast live people cards is described. The method may include detecting a user interest in a person through interaction with an application user interface; submitting one or more calls to a people service to determine one or more of a user context and a relevant person context; receiving people data associated with the person including dynamic information stored in a server cache for rapid access; displaying the received people data in form of one or more people cards, where the people data is selected and ordered for display based on the user context and the relevant person context; detecting user behavior associated with viewing and interacting with the displayed people data; and providing user behavior information to the people service for selection of relevant people data to be stored at the server cache for rapid retrieval.

According to some examples, the application user interface may be associated with one or more of a productivity application, a communication application, a contact management application, a calendar application, a cloud storage application, a collaboration application, a social networking application, and a professional networking application.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to provide context and social distance aware fast live people cards, the method comprising:
   in response to receiving detection of a user interest in a person of interest from a user, determining a user context of the user and a relevant person context of the person of interest, wherein the user context includes data representing an identity of a website via which the user interest in the person of interest is detected, and wherein the relevant person context includes data representing one or more of an organizational position, location, or working hours of the person of interest;
   retrieving people data associated with the person of interest including dynamic information stored in a server cache for rapid access, the retrieved people data being a subset of all available data regarding the person of interest and selected in accordance with the identity of the website via which the user interest is detected and in accordance with the relevant person context, wherein the subset includes data representing one or more documents recently modified by the person of interest and stored and accessible at the website via which the user interest is detected; and
   providing the retrieved people data to be displayed in a form of one or more people cards, wherein the people data is selected and ordered for display in the one or more people cards based on the user context and the relevant person context.

2. The method of claim 1, wherein determining the user context comprises:
   determining one or more attributes of the user including the user's organizational position, social distances to other people, a preference of the user, a location of the user, working hours of the user, and an application employed by the user.

3. The method of claim 1, wherein determining the relevant person context comprises:
   determining one or more attributes of the person of interest including the organizational position of the person of interest, a preference of the person of interest, the location of the person of interest, the working hours of the person of interest, and an application employed by the person of interest.

4. The method of claim 3, wherein determining the relevant person context further comprises:
   determining a social distance between the user and the person of interest; and
   evaluating the one or more attributes of the person of interest in light of the determined social distance.

5. The method of claim 1, further comprising:
receiving user behavior information to determine relevant people data to be stored at the server cache for rapid retrieval.

6. The method of claim 5, further comprising:
receiving people data from a plurality of sources; and
selecting a portion of the received people data to be stored at the server cache based on the received user behavior information and a social distance between the user and the people of interest associated with the received people data.

7. The method of claim 1, further comprising:
grouping the people data to be displayed on the one or more people card according to categories.

8. The method of claim 7, wherein the categories include insights and actions, contact details, organizational information, peers information, group memberships, conversations, events, and documents.

9. The method of claim 7, further comprising:
selecting which groups of people data to display and an order of the groups of people data to display based on the user context and the relevant person context.

10. The method of claim 9, further comprising:
providing detailed content with a group of people data to be displayed in form of a people card in response to a selection of the group, wherein the people card is expandable to occupy a portion of or an entire display.

11. The method of claim 10, further comprising:
selecting the detailed content and an order of information within the detailed content to be displayed based on the user context and the relevant person context.

12. A computing device to provide context and social distance aware fast live people cards, the computing device comprising:
a communication interface configured to facilitate communication;
a memory configured to store instructions; and
one or more processors coupled to the memory and configured to execute a people service, wherein the people service is configured to:
in response to receiving detection of a user interest in a person of interest from a client application, determine a user context of the user and a relevant person context of the person of interest, wherein the user context includes data representing a website via which the user interest in the person of interest is detected, and wherein the relevant person context includes data representing one or more of an organizational position, location, or working hours of the person of interest;
retrieve people data associated with the person of interest including dynamic information stored in a server cache for rapid access, the retrieved people data being a subset of all available data regarding the person of interest and selected in accordance with an identity of the website via which the user interest is detected and in accordance with the relevant person context, wherein the subset includes data representing one or more documents recently modified by the person of interest and stored and accessible at the website via which the user interest is detected;
provide the retrieved people data to be displayed in a form of one or more people cards, wherein the people data is selected and ordered for display in the one or more people cards based on the user context and the relevant person context;
receive user behavior information to determine relevant people data to be stored at the server cache for rapid retrieval; and
select a portion of the relevant people data to be stored at the server cache based on the received user behavior information and a social distance between the user and the people associated with the relevant people data.

13. The computing device of claim 12, wherein the client application is part of a hosted service.

14. The computing device of claim 13, wherein the hosted service includes one or more of a productivity service, a collaboration service, a cloud storage service, a communication service, and the people service.

15. The computing device of claim 12, wherein the received user behavior information is in form of one or more calls.

16. The computing device of claim 15, wherein the people service includes an aggregation controller configured to employ user context to determine one or more people data providers to pass the one or more calls to.

17. The computing device of claim 16, wherein a storage strategy in the server cache is determined by the one or more people data providers.

18. The computing device of claim 12, wherein the server cache is a variable size, multi-tiered cache.

19. A method to provide context and social distance aware fast live people cards, the method comprising:
detecting a user interest in a person of interest through interaction with a website via an application user interface;
submitting one or more calls to a people service to determine a user context of the user and a relevant person context of the person of interest, wherein the user context includes data representing an identity of the website via which the user interest is detected, and wherein the relevant person context includes data representing one or more of an organizational position, location, or working hours of the person of interest;
receiving people data associated with the person of interest including dynamic information stored in a server cache for rapid access, the received people data being one or more documents recently modified by the person of interest and stored and accessible at the website via which the user interest is detected, queried in accordance with the identity of the website via which the user interest is detected, and selected in accordance with the relevant person context;
displaying the received people data in a form of one or more people cards, wherein the people data is selected and ordered for display in the one or more people cards based on the user context and the relevant person context;
detecting user behavior associated with viewing and interacting with the displayed people data; and
providing user behavior information to the people service for selection of relevant people data to be stored at the server cache for rapid retrieval.

20. The method of claim 19, wherein the application user interface is associated with one or more of a productivity application, a communication application, a contact management application, a calendar application, a cloud storage application, a collaboration application, a social networking application, and a professional networking application.

* * * * *